United States Patent [19]

Willis

[11] 4,240,012
[45] Dec. 16, 1980

[54] REGULATED DEFLECTION CIRCUIT

[75] Inventor: Donald H. Willis, Indianapolis, Ind.

[73] Assignee: RCA Corporation, New York, N.Y.

[21] Appl. No.: 98,922

[22] Filed: Nov. 30, 1979

[51] Int. Cl.³ .......................................... H01J 29/70
[52] U.S. Cl. .................................. 315/408; 315/400;
315/411
[58] Field of Search ...................... 315/400, 411, 408

[56] References Cited

U.S. PATENT DOCUMENTS

| | | | |
|---|---|---|---|
| 3,881,135 | 4/1975 | Dietz | 315/411 X |
| 3,970,780 | 7/1976 | Minoura | 315/411 X |
| 4,146,823 | 3/1979 | Dietz | 315/408 |
| 4,156,834 | 5/1979 | Farina | 315/408 X |

*Primary Examiner*—Malcolm F. Hubler
*Attorney, Agent, or Firm*—Eugene M. Whitacre; Paul J. Rasmussen; Joseph J. Laks

[57] ABSTRACT

A trace switch including a horizontal output transistor is coupled across the series arrangement of a horizontal deflection winding and trace capacitor. The trace capacitor is charged from a source of unregulated DC input voltage through the primary winding of a flyback transformer. The emitter of the horizontal output transistor is coupled to ground through a first winding of a second transformer. A second capacitor is coupled between ground and the series arrangement of the deflection winding and trace capacitor. The average trace voltage across the trace capacitor is constrained to assume the difference in voltage between the unregulated input voltage and the voltage developed across the second capacitor. The charge/discharge cycle of the second capacitor is controlled by the current flowing in the second transformer. When the horizontal output transistor becomes cut off at the beginning of retrace, current ceases to flow in the first winding of the second transformer and begins to flow in a second winding of the transformer through a diode, returning current to the unregulated voltage source. At a controlled subsequent instant, a controllable switch such as an SCR is turned on and directs current in the second winding away from the source. The average voltage across the second capacitor and thus the average trace voltage may be regulated by varying the turn-on instant of the controllable switch.

10 Claims, 3 Drawing Figures

REGULATED DEFLECTION CIRCUIT

This invention relates to regulated deflection circuits for television receivers, for example.

In typical television receiver circuits, the horizontal deflection winding and a trace capacitor are series coupled. The trace capacitor is charged to a trace voltage from a B+ voltage supply through a flyback transformer primary winding. A trace switch then couples the trace capacitor and applies the capacitor's voltage across the deflection winding to generate a trace deflection current. During retrace, the trace switch is nonconductive and the deflection winding and flyback transformer primary winding resonate with a retrace capacitor to generate retrace pulse voltages in the two windings. The retrace pulse voltage in the flyback transformer primary winding is stepped up by a high voltage winding to generate the high voltage or ultor accelerating potential.

To maintain a constant high voltage and raster width, the trace voltage applied to the deflection winding and the retrace pulse voltages developed in the flyback transformer are regulated. To achieve this result, conventional television receiver regulators using controllable semiconductor switching elements develop a regulated B+ voltage that is derived from the unregulated AC line or mains supply. For greater efficiency, such switching elements typically operate at the relatively high frequencies of 16 and 20 kilohertz.

Other types of television receiver regulators are disclosed in the U.S. patent application of D. H. Willis, Ser. NO. 058,659, filed July 19, 1979, entitled "REGULATED DEFLECTION CIRCUIT WITH REGULATOR SWITCH CONTROLLED BY DEFLECTION CURRENT," said Willis application being a continuation of Ser. No. 926,337 filed July 20, 1978, now abandoned, and hereby incorporated by reference. Such regulators apply the unregulated DC input voltage through the flyback transformer primary winding to the deflection winding and trace capacitor. A second, controlled voltage, developed, for example, across a second capacitor, is applied to the series arrangement of the deflection winding and trace capacitor. The trace voltage is constrained to assume the difference between the input voltage and the controlled voltage and may therefore be regulated by appropriately varying the controlled voltage. The controlled voltage developed across the second capacitor may be varied, in part, by varying the current flow in an inductance such as a two-winding transformer, coupled to the second capacitor. The charge/discharge of the second capacitor occurs at the 16 kilohertz frequency of horizontal deflection.

A feature of the invention is to control the current in the two-winding transformer by means of a regulator switch coupled to one of the transformer windings. The regulator switch is so arranged in the inductance circuit, for example, as to DC couple the gating or switching signal voltage without the need for transformer coupling. The location of the regulator switch in the inductance circuit is also such as to apply relatively low forward and reverse voltages across the switch when the switch is nonconductive.

Another feature of the invention is to use a gate controlled device such as a silicon controlled rectifier as the regulator switch. The SCR is coupled to the inductance in such a manner as to switch the SCR into nonconduction by means of a reverse voltage applied to the anode of the SCR rather than commutating the SCR out of conduction by an attempted current reversal in the SCR. Power dissipation in the SCR is reduced. Furthermore, as relatively low stress is being applied to the SCR, a relatively inexpensive device may be used.

Figure 1:
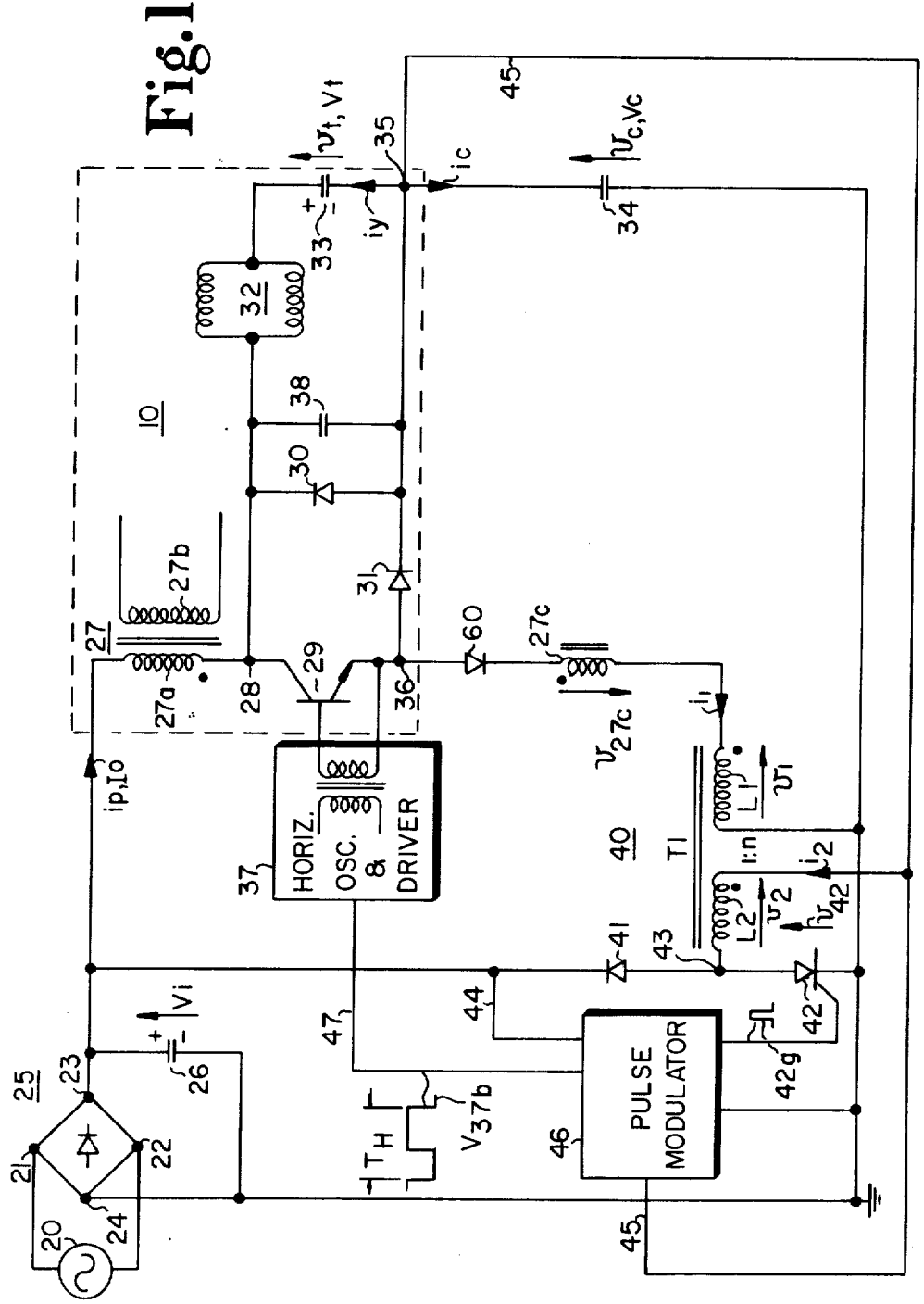
FIG. 1 illustrates a regulated deflection circuit embodying the invention.

In FIG. 1, a source of alternating current power line voltage 20 is coupled across input terminals 21 and 22 of a full-wave bridge rectifier 25. A filter capacitor 26 is coupled across output terminals 23 and 24 of rectifier 25, with terminal 24 comprising the ground or common current return terminal. A filtered but unregulated DC input voltage $V_i$ is developed across capacitor 26.

Input voltage $V_i$ is applied to a horizontal deflection circuit 10 of a television receiver. Horizontal deflection circuit 10 includes a horizontal output or flyback transformer 27 with one terminal of the primary winding 27a of the flyback transformer coupled to terminal 23 and the other terminal of the primary winding coupled to a terminal 28.

Energy is transferred from terminal 23 to various television receiver load circuits by coupling the load circuits by flyback transformer secondary windings, schematically indicated in FIG. 1 as a single load winding 27b. For example, winding 27b may, in part, represent a high voltage winding which provides the ultor accelerating potential for the television receiver picture tube.

Coupled between terminal 28 and a terminal 35 is the series arrangement of a horizontal deflection winding 32 and an "S" shaping of trace capacitor 33. Also coupled between terminals 28 and 35 are a retrace capacitor 38, damper diode 30 and the series combination of a horizontal output transistor 29 and a diode 31. The emitter electrode of transistor 29 is coupled to a terminal 36, the anode of diode 31.

Coupled between terminal 35 and ground is a second capacitor 34. Coupled between terminal 36 and ground are elements of a regulator 40 including the series arrangement of a diode 60, a secondary winding 27c of flyback transformer 27, and a winding L1 of a regulator transformer T1.

One terminal of a second regulator transformer winding L2 is coupled to terminal 35. The other terminal of winding L2 is coupled to terminal 23 through a diode 41. A silicon controlled rectifier SCR 42 is coupled between ground and a terminal 43, the junction of diode 41 and winding L2.

Horizontal deflection circuit 10 functions as a load circuit coupled between terminal 23 and terminals 35 and 36 of FIG. 1. The input current or flyback primary winding current $i_p$ flowing through primary winding 27a includes a DC load current component $I_0$ which varies with loading changes of horizontal deflection circuit 10.

Since capacitor 34 is coupled between terminal 35 and ground, the DC or average voltage developed across trace capacitor 33 equals the voltage difference between the input voltage $V_i$ and the DC or average voltage developed by regulator 40 across terminal 35 and ground or across capacitor 34. With regulator 40 controlling the voltage across capacitor 34 in a manner hereinafter to be described, a regulated voltage may be developed for horizontal deflection circuit 10.

During a start-up interval, after the power line voltage is first applied between terminals 21 and 22, input voltage $V_i$ is developed across capacitor 26 and current begins to flow from terminal 23 through flyback transformer primary winding 27a to charge the serially coupled trace capacitor 33 and capacitor 34. A conventional horizontal oscillator and driver 37 applies a conventional horizontal deflection rate, square-wave, switching voltage $V_{37a}$, illustrated in FIG. 2b, to the base of horizontal output transistor 29 to switch the conduction states of the transistor each deflection cycle so as to generate a horizontal trace current in deflection winding 32 during the horizontal trace interval. After transistor 29 is switched into cutoff by the square-wave voltage $V_{37a}$, a horizontal retrace pulse voltage is developed in retrace capacitor 38, and a retrace current flows in deflection winding 32 during the horizontal retrace interval.

As capacitors 33 and 34 continue to charge, the peak-to-peak horizontal trace current and the retrace pulse voltage amplitudes developed across the flyback transformer windings continue to increase until a steady state or equilibrium condition exists wherein a trace voltage $v_t$ is established across trace capacitor 33 and an equilibrium voltage $v_c$ is developed across capacitor 34.

During the entirety of the horizontal trace interval, terminals 28 and 35 are coupled together due either to the conduction of damper diode 30, or the simultaneous conduction of transistor 29 and diode 31. The trace voltage $v_t$ is therefore applied across the deflection winding during the trace interval $t_3$–$t_{10}$ to produce the positive-going sawtooth deflection current $i_y$, of peak amplitude $I_p$, as illustrated in FIG. 2a. At time $t_7$, the center of trace, the deflection current reverses direction.

Assume, for explanatory purposes, that flyback transformer primary winding 27a functions as a current source producing a primary winding current $i_p = I_0$, a constant current representing the average or DC load current component of the primary winding current. Also assume that the voltages across capacitors 33 and 34 during a given horizontal deflection cycle equal constant DC voltage $V_t$ and $V_c$ representing, respectively, the average voltages developed across the capacitors. At time $t_5$ of FIG. 2, the leading edge of square-wave voltage $V_{37a}$, illustrated in FIG. 2b, switches horizontal output transistor 29 into conduction. Terminal 35 is now coupled through damper diode 30 and horizontal output transistor 29 to terminal 36. With both damper diode 30 and horizontal output transistor 29 conducting, diode 31 is reverse biased.

The voltage $V_c$ of capacitor 34 is applied to diode 60, forward biasing the diode into conduction. With horizontal output transistor 29 conducting, the voltage $v_1$ applied across winding L1 of regulator transformer T1 during the remaining interval $t_5$–$t_{10}$ of the horizontal trace interval equals $V_c + V_s$, the sum of the voltages developed across capacitor 34 and flyback transformer secondary winding 27c, as illustrated in FIG. 2g. The voltage $V_s$ represents the scan voltage developed across secondary winding 27c during the trace interval $t_3$–$t_{10}$, as illustrated in FIG. 2f.

With a positive voltage developed across winding L1 between times $t_5$–$t_{10}$ equal to $V_c + V_s$, an increasing current $i_1$ flows through regulator transformer winding L1 as illustrated in FIG. 2c. The current $i_1$ begins to flow at time $t_5$, at a nonzero value of $I_3$, for reasons to be explained later. At time $t_{10}$, the end of the trace interval, the current $i_1$ has reached a magnitude $I_1$. The slope of the current $i_1$ is proportional to $(V_c + V_s)/L_1$, where $L_1$ equals the inductance of regulator transformer winding L1.

With a flyback transformer primary winding current of $I_0$ magnitude flowing to the collector of horizontal output transistor 29, and with a current $i_1$ flowing from the emitter of horizontal output transistor 29 to regulator transformer winding L1, the difference between these two currents flows in capacitor 34 as a current $i_c$, which charges the capacitor between time $t_5$–$t_8$, as illustrated in FIG. 2c by the upwardly pointing arrows 34c. At time $t_8$, the current $i_1$ equals the load current $I_0$ and no capacitor current $i_c$ flows. Between times $t_8$–$t_{10}$, the current $i_1$ is greater than the load current $I_0$ and capacitor 34 is discharged during this interval in order to provide the remaining portion of the current $i_1$ not being provided by the load current $I_0$, as illustrated in FIG. 2c by the downwardly pointing arrows 34d.

At time $t_6$, the charging current $i_c$ flowing in capacitor 34 equals in magnitude the negative horizontal deflection current $i_y$, as illustrated in FIGS. 2c and 2a by the upwardly pointing arrow 34' and by the downwardly pointing arrow 32'. The current in damper diode 30 is therefore zero. After time $t_6$, the algebraic sum of the deflection winding current $i_y$ and capacitor current $i_c$ is positive. Thus, damper diode 30 becomes reverse biased and diode 31 becomes forward biased to conduct current.

After time $t_9$, a negative voltage is applied to the base of horizontal output transistor 29, as illustrated in FIG. 2b by the low state of the voltage $V_{37a}$ after time $t_9$. Horizontal output transistor 29 becomes cut off at time $t_{10}$, or time $t_0$, initiating the horizontal retrace interval which occurs between times $t_0$–$t_3$, as illustrated in FIG. 2a and in FIG. 2f by the retrace pulse voltage of peak magnitude $V_r$ developed in flyback transformer secondary winding 27c.

With horizontal output transistor 29 cut off at time $t_0$, current ceases to flow in winding L1 of regulator transformer T1. To maintain flux continuity in the transformer, the voltage $v_2$, as referenced to the undotted terminal of winding L2, becomes sufficiently negative to forward bias the unidirectional current conducting device, diode 41, into conducting a current $i_2$ in a first path from winding L2 to terminal 23. With diode 41 conducting, the voltage across winding L2 is clamped to the voltage difference established between terminal 23 and terminal 35, namely to the trace voltage $v_t$.

The magnitude of the current $i_2$ flowing at time $t_0$, the beginning of retrace, is such as to maintain flux continuity in regulator transformer T1 after the current $i_1$ stops flowing. Thus, the magnitude of the current $i_2$ at time $t_0$ equals $nI_1$, where n equals the turns ratio of winding L1 to winding L2. Assuming for illustrative purposes a unity turns ratio, the magnitude of the current $i_2$ at time $t_0$ equals $I_1$, as illustrated in FIG. 2c.

With a negative voltage of magnitude $V_t$ applied across regulator transformer winding L2 after time $t_0$, the current $i_2$ decreases between times $t_0$–$t_2$ with a negative slope proportional to $V_t/L_2$ reaching a minimum, positive magnitude $I_2$ at time $t_2$. At the controlled instant $t_2$, a pulse modulator regulator control circuit 46 applies a gating pulse 42g to the gate of SCR 42, as schematically illustrated in FIG. 2d. When the SCR becomes conductive, diode 41 becomes reverse biased.

The current $i_2$ now flows only in a second path from terminal 43 to ground through SCR 42. At time $t_2$, with SCR 42 conductive, the voltage applied across regulator transformer winding L2 equals the voltage $V_c$ across capacitor 34, or the voltage difference between the voltage at terminal 35 and ground, as illustrated in FIG. 2g by the voltage $v_2$. The voltage $v_1$ across winding L1 and the voltage $v_2$ across winding L2 are illustrated as the same waveform FIG. 2g, assuming close coupling of the two windings and a unity turns ratio.

After $t_2$, with a positive voltage of magnitude $V_c$ applied across winding L2, the current $i_2$ in winding L2 increases with a positive slope proportional to $V_c/L_2$, as illustrated in FIG. 2c. The current $i_2$ increases until time $t_5$, when horizontal output transistor 29 is made conductive. At time $t_5$, SCR 42 becomes reverse biased, as illustrated in FIG. 3h by the anode-to-cathode voltage $v_{42}$ developed across SCR 42 between times $t_5$–$t_{10}$. The voltage $v_{42}$ across SCR 42 between times $t_5$–$t_{10}$ equals the difference of the voltage $V_c$ across capacitor 34 and the voltage $v_2$ across winding L2. During the interval $t_5$–$t_{10}$, the voltage $v_2$ equals the transformed voltage $v_1 = V_c + V_s$, assuming a unity turns ratio. Thus, as soon as horizontal output transistor 29 turns on at time $t_5$, the trace voltage developed across flyback transformer secondary winding 27c is reflected through regulator transformer T1 and applied to SCR 42 as a net negative voltage of magnitude $V_s$, thereby turning off the SCR.

To maintain flux continuity in transformer T1 after SCR 42 turns off, the current $i_1$ flowing in winding L1 begins to flow at time $t_5$ with a magnitude $I_3$ determined by the turns ratio of the transformer. For unity turns ratio, the magnitude $I_3$ equals the peak magnitude of the current $i_2$ flowing in winding L2 just prior to SCR turn-off, as illustrated in FIG. 2c.

Because flyback transformer 27 is assumed to function as a contant current source, the current flowing in flyback transformer primary winding 27a, during the retrace interval $t_0$–$t_3$, equals the current $I_0$, as illustrated in FIG. 2c. During the interval $t_0$–$t_5$, when horizontal output transistor 29 is nonconductive and when diode 41 and then SCR 42 is conductive, th current $i_2$ flowing in regulator transformer winding L2 first discharges capacitor 34 during the interval $t_0$–$t_1$, when the current $i_2$ is greater than the current $I_0$, and then charges capacitor 34 during the interval $t_1$–$t_5$, when the current $i_2$ is less than the current $I_0$, as illustrated in FIG. 2c by the downwardly pointing arrows 34d between times $t_0$–$t_1$, and by the upwardly pointing arrows 34c between times $t_1$–$t_5$.

The DC path for the load current $I_0$ flowing from terminal 23 to ground is through flyback transformer primary winding 27a, the DC path then divides into two sections. The first section path is through diode 60, flyback transformer secondary winding 27c and regulator transformer winding L1; the second section path is through diode 31, conductor line 45, regulator transformer winding L2 and SCR 42. Both of the DC section paths bypass capacitor 34, as no DC current can flow through the capacitor.

Because no DC current can flow in capacitor 34, the total positive charge $q_c$ deposited on capacitor 34 during the complete deflection cycle $t_0$–$t_{10}$ of FIG. 2c equals the total negative charge $q_d$ removed from the capacitor during the cycle, under equilibrium operating conditions. Thus, as illustrated in FIG. 2c, the area encompassed by all of the upwardly pointing arrows 34c equals the area encompassed by all of downwardly pointing arrows 34d.

The DC or average value $V_t$ of the trace voltage $v_t$ is constrained to assume a voltage representative of the algebraic difference between the unregulated DC input voltage $V_i$ and the average or DC voltage $V_c$ across capacitor 34. The peak-to-peak trace current in deflection winding 32 and the retrace pulse voltages developed across the windings of flyback transformer 27 are a function of the average trace voltage $V_t$. Thus, by controlling the voltage $v_c$ across capacitor 34, the trace voltage $v_t$, raster width, and high voltage, may be regulated.

Regulator pulse modulator 46 is made responsive to changes in the trace voltage $v_t$ by applying the unregulated input voltage $V_i$ to the modulator along a conductor line 44 and by applying the voltage $v_c$ across capacitor 34 along conductor line 45. The average trace voltage $V_t$ therefore is equal to the difference between the voltage on conductor line 44 and the average voltage on conductor line 45.

Regulator pulse modulator 46 pulse position modulates the gating pulses 42g applied to the gate of SCR 42 to vary the turn-on time of the SCR in accordance with the changes in the trace voltage $v_t$. Should the input voltage $V_i$ increase, for example, the average trace voltage $V_t$ also tends to increase. As illustrated in FIG. 2e, pulse modulator 46 applies a gating pulse 42g' at a later instant $t_4$.

A nonequilibrium condition momentarily ensues in which the charge/discharge of capacitor 34 is unbalanced. In this momentary nonequilibrium condition, more charge is deposited on capacitor 34 during a deflection cycle than is removed. The voltage on capacitor 34 increases until a new equilibrium condition results, as illustrated by the dashed waveforms $i_1'$ and $i_2'$ of FIG. 2c, such that the charge/discharge cycle of capacitor 34 is balanced at a new increased average voltage $V_c'$, as is required to maintain a constant average trace voltage $V_t$ with increased input voltage $V_i$.

The operation of regulator 40 of FIG. 1 involves the use of a controlled switch, SCR 42, to modulate the current flowing in winding L2 between times $t_0$–$t_5$. By modulating the current in winding L2, a deflection circuit quantity such as the trace voltage $V_t$ or the retrace pulse voltage amplitude may be regulated. The time interval over which SCR 42 may be gated into conduction includes the retrace interval and the first portion of the trace interval until the conduction of horizontal output transistor 29 terminates conduction of current in winding L2 and turns off SCR 42. It is only over this interval that a positive anode-cathode voltage is applied to the SCR.

Since SCR 42 is coupled in the L2 winding circuit path, the stress on the SCR is substantially reduced from that produced by other switching or SCR regulator circuit configurations in which retrace pulse voltages are applied to the SCR. As illustrated in FIG. 2h, the voltage $V_{42}$ across SCR 42 when it is nonconductive between times $t_0$–$t_2$ within the retrace interval equals a relatively low stress-producing DC input voltage $V_i$, and equals a relatively low stress-producing voltage $-V_s$ between times $t_5$–$t_{10}$, within the trace interval.

Figure 2:
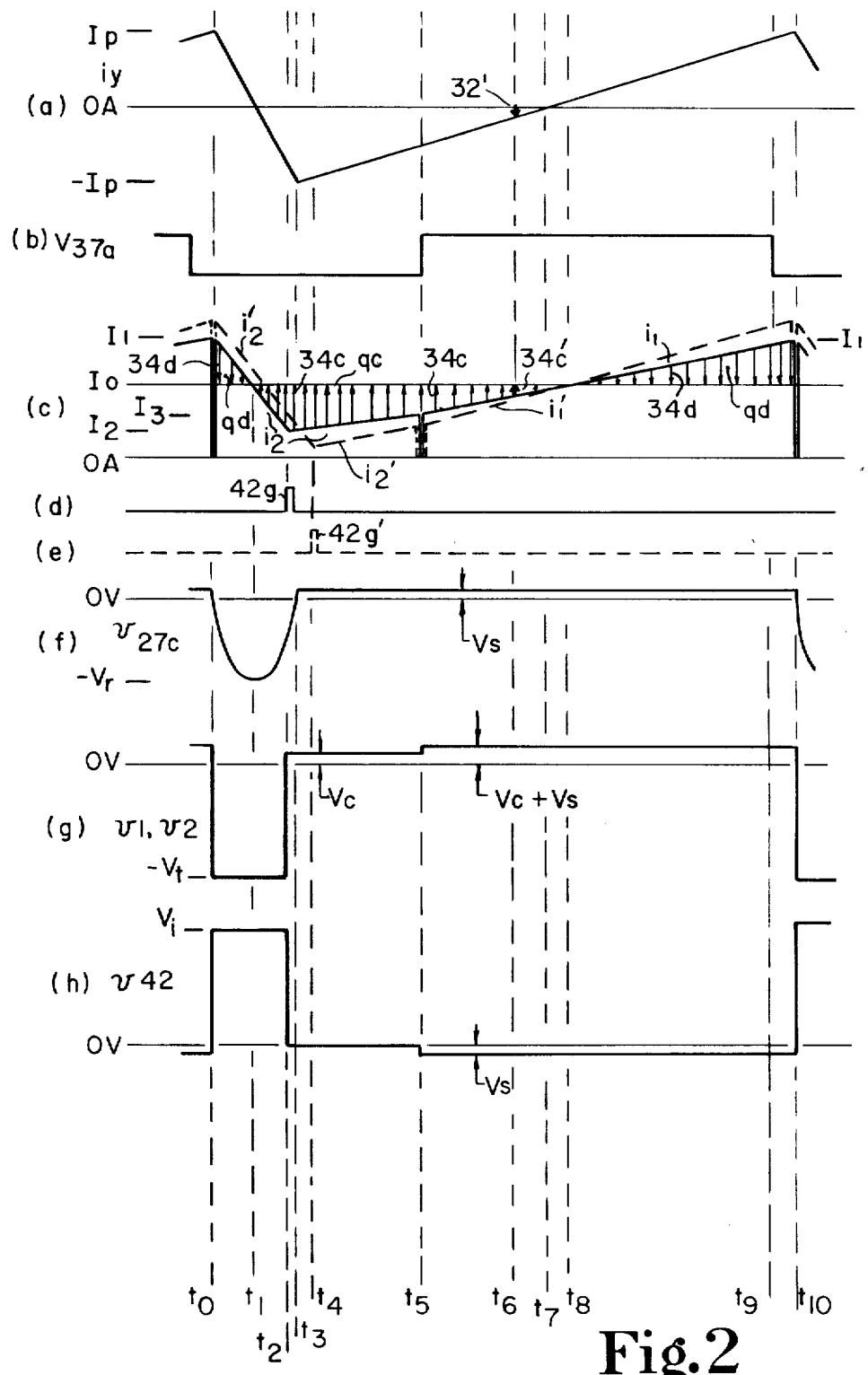
FIG. 2 illustrates waveforms associated with the circuit of FIG. 1.

SCR 42 is made nonconductive by the turning on of horizontal output transistor 29 at time $t_5$ in FIG. 2. When transistor 29 turns on, a positive voltage is developed across winding L1 and is transformed as a negative voltage applied to the anode of SCR 42 to turn off the SCR at time $t_5$. Thus, SCR 42 is turned off by application of a reverse biasing voltage for a substantial portion of the trace interval rather than by commutation out of conduction by a relatively slowly decreasing anode current. Less turn-off current dissipation occurs in the SCR regulator arrangement of FIG. 1, requiring the use of a less robust and less expensive device. It should be noted that although FIG. 2c indicates a sharp transition of current flow from winding L2 to winding L1 at time $t_5$, the actual transition is much less abrupt with some overlapping of conduction of SCR 42 and horizontal output transistor 29 immediately after time $t_5$.

Flyback transformer secondary winding 27c in series with regulator transformer winding L1 functions to ensure that a sufficient negative voltage is applied to the anode of SCR 42 at time $t_5$ to properly turn off the SCR. A unity turns ratio of winding L1 to winding L2 may thus be selected while still enabling the reflected voltage to be of sufficient magnitude to turn off SCR 42. An advantage of selecting a unity turns radio is the ability to bifilar wind L1 and L2 for tight coupling.

Because a positive retrace pulse voltage is also applied to the emitter of horizontal output transistor 29, the circuit arrangement of FIG. 1 has the further advantage that the voltage stress on the horizontal output transistor is reduced when compared with the stress on the transistor had winding 27c been omitted.

Figure 3:
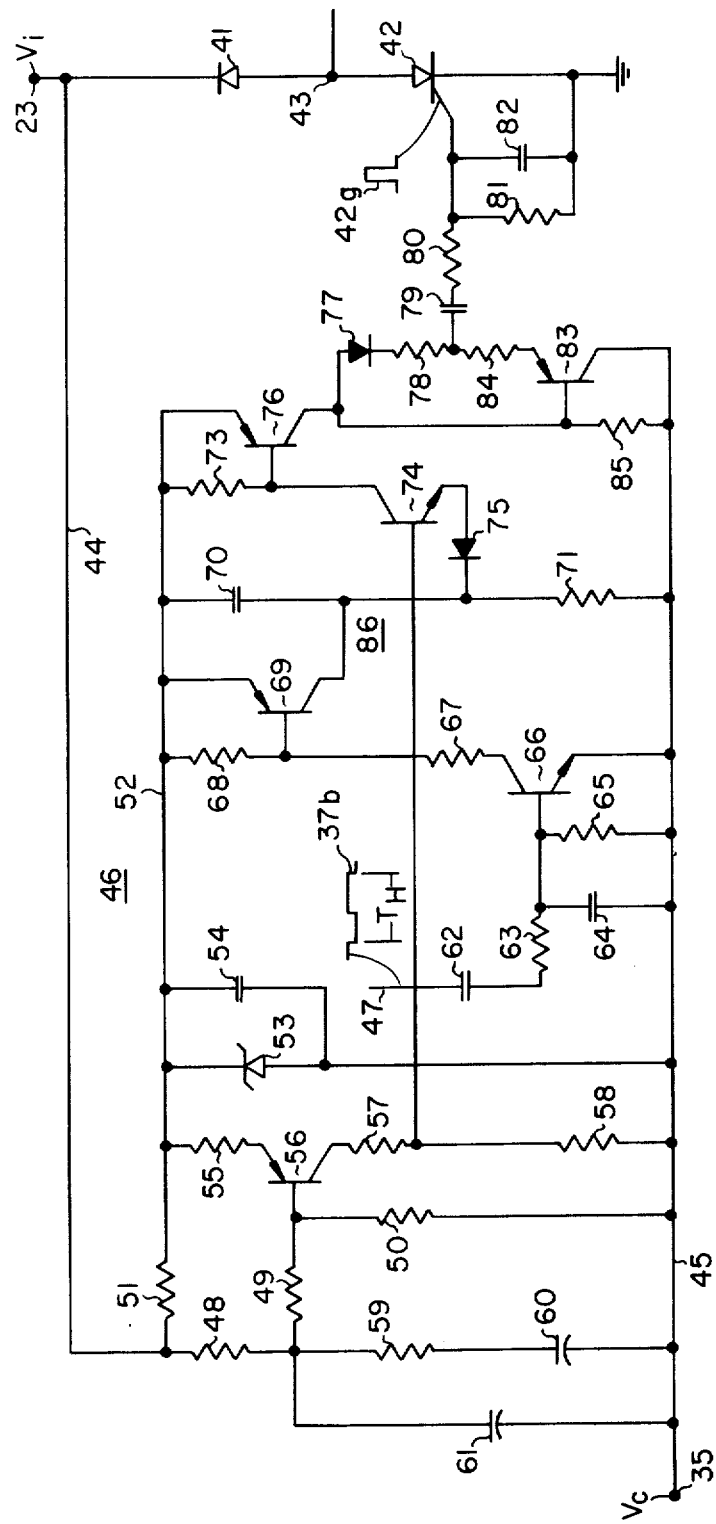
FIG. 3 illustrates an embodiment of the pulse modulator regulator control circuit of FIG. 1.

An embodiment of pulse modulator regulator control circuit 46 is illustrated in FIG. 3. The input voltage $V_i$ is applied by conductor line 44 to one end of a voltage divider comprising resistors 48–50. The voltage $v_c$ developed across capacitor 34 is applied to the other end of the voltage divider by conductor line 45. The average voltage developed across the divider is thus equal to the average trace voltage $V_t$. The base of an error amplifier transistor 56 is coupled to the junction of resistors 49 and 50 and the emitter is coupled to a reference zener diode 53 through a resistor 55. Biasing current for zener diode 53 is obtained from terminal 23 through a resistor 51. A filter capacitor 54 is coupled across zener diode 53.

Error amplifier transistor 56 compares the average trace voltage $V_t$, after filtering, with the zener diode reference voltage to provide, at the collector of error amplifier transistor 56, an inverted and amplified DC feedback voltage representative of trace voltage changes. The feedback voltage at the collector of transistor 56 is applied to the base of a comparator 74 through a resistor 57 of a voltage divider comprising resistors 57 and 58. The feedback voltage at the base of transistor 74 is compared with a negative-going ramp voltage developed across a resistor 71 and coupled to the emitter of transistor 74 through a diode 75. The negative-going ramp voltage is produced by a ramp generator 86 comprising a series arrangement of capacitor 70 and resistor 71 coupled across conductor lines 52 and 45, and a discharge transistor 69 coupled across capacitor 70.

As capacitor 70 becomes charged during each deflection cycle, a negative-going sawtooth current flows in capacitor 70 and resistor 71, producing the negative-going ramp voltage across resistor 71. When the ramp voltage applied to the emitter of transistor 74 has decreased sufficiently below the feedback voltage applied to the base of the transistor, the transistor turns on, enabling a sufficiently large forward bias voltage to be developed across a resistor 73 to turn on a transistor 76.

When transistor 76 turns on, a positive voltage is applied through a diode 77, resistor 78, capacitor 79 and resistor 80 to the gate of SCR 42 to provide the gating pulse 42g illustrated schematically in FIG. 3 to turn SCR 42 on. A resistor 81 and a capacitor 82 prevent SCR 42 gate turn-on during the steeply rising SCR anode voltage at time $t_0$ of FIG. 2h. At the same time, a transistor 83 becomes cut off when current flowing from transistor 76 through a resistor 85 develops a reverse biasing voltage.

The triggering of SCR 42 is synchronized with horizontal deflection by resetting ramp generator 86 each horizontal deflection cycle. A square-wave voltage 37b, illustrated in FIG. 3, is applied to the base of a reset transistor 66 through a capacitor 62 and a resistor 63. A capacitor 64 and a resistor 65 are coupled between the base of transistor 66 and conductor line 45. Square-wave voltage 37b is obtained from horizontal oscillator and driver 37 of FIG. 1 and is applied to capacitor 62 of FIG. 3 along a conductor line 47. Square-wave voltage 37b is in-phase with the square-wave voltage 37a applied to horizontal output transistor 29, with the positive-going edge of square-wave voltage 37b occurring at time $t_5$ of FIG. 2. Thus, reset transistor 66 is turned on about the time that horizontal output transistor 29 is turned on.

The collector of reset transistor 66 is coupled through a resistor 67 to the junction of a resistor 68 and the base of discharge transistor 69. When transistor 66 becomes conductive, transistor 69 turns on, discharging capacitor 70 completely. Capacitor 70 remains discharged until transistor 66 is cut off by the decrease in differentiated pulse voltage through capacitor 62 which occurs shortly after the discharge of capacitor 70.

When transistor 66 is cut off, discharge transistor 69 becomes nonconductive, and the negative-going ramp voltage is developed across resistor 71. By beginning the ramp voltage prior to the initiation of retrace, SCR 42 may be gated into conduction as early as time $t_0$, the beginning of retrace. Thus, the regulation range of regulator 40 encompasses the interval beginning at time $t_0$ of FIG. 2, the initiation of the retrace interval, through time $t_5$, the turn-on instant of the horizontal output transistor 29.

Near time $t_5$, the positive-going edge of square-wave 37b turns on transistor 66. Transistor 69 discharges capacitor 70 and turns off comparator transistor 74. Transistor 76 then becomes cut off. The voltage that was developed across capacitor 79 during the conduction of transistor 76 forward biases transistor 83 coupled to the capacitor through a resistor 84. Transistor 83 then discharges capacitor 79 to conductor line 45.

Another arrangement of a regulated deflection circuit similar in operation to the circuit of FIG. 1 includes coupling the capacitor 34 between terminal 35 and terminal 23 rather than between terminal 35 and ground. In still another arrangement, the terminal of regulator transformer winding L2 remote from terminal 43 may be coupled to ground rather than to terminal 35. In still a third arrangement, for example, an additional flyback transformer secondary winding may be coupled in series with regulator transformer winding L2.

What is claimed is:
1. A regulated deflection circuit, comprising:
   a deflection winding;
   a voltage source for developing a first DC voltage;
   a trace capacitance coupled to said voltage source for developing a trace voltage;

trace switching means coupled to said deflection winding for applying said trace voltage to said deflection winding to generate a trace deflection current each deflection cycle when said trace switching means is conductive, a retrace pulse voltage being developed across said deflection winding when said trace switching means is cut off during a retrace interval of each deflection cycle;

means including a regulator transformer with first and second windings for establishing a second substantially DC voltage across first and second terminals, said first winding coupled to said trace switching means and one of said first and second terminals for applying said second DC voltage to said first winding to generate current in said first winding, said trace voltage constrained to assume a voltage representative of the difference in voltage between said first and second DC voltages, said second winding conducting current when the current in said first winding is cut off at the initiation of said retrace interval;

second switching means coupled to said second winding, the conduction of said second switching means controlling the current in said second winding to vary said second voltage; and control means coupled to said second switching means and responsive to a deflection circuit quantity for altering the conduction of said second switching means to regulate said deflection circuit quantity.

2. A circuit according to claim 1 wherein said second DC voltage establishing means includes a second capacitance coupled across said first and second terminals, said second switching means controlling the charge/discharge cycle of said second capacitance.

3. A circuit according to claim 1 including a unidirectional current conducting means coupled to said second winding, said unidirectional current conducting means directing current in said second winding in a first path at the initiation of said retrace interval, said second switching means directing current in said second winding in a second path when said second switching means becomes conductive.

4. A circuit according to claim 3 wherein a first terminal of said second winding is coupled to a junction terminal of said second switching means and said unidirectional current conducting device, and a second terminal of said second winding is coupled to a terminal of said second switching means other than said junction terminal.

5. A circuit according to claim 3 including means for applying said second DC voltage to said second winding.

6. A circuit according to claims 2, 3, 4 or 5 wherein said unidirectional current conducting means is coupled to said voltage source for returning energy to said voltage source.

7. A circuit according to claim 3 including a flyback transformer with first and second windings, said trace capacitance being coupled to said voltage source through said first winding of said flyback transformer and wherein said trace switching means comprises a damper diode and an output switching means, said output switching means being turned on each deflection cycle in response to a deflection-rate switching signal applied to a control terminal of said output switching means.

8. A circuit according to claim 7 including a second diode coupled between said output switching means and said damper diode, said first winding of said regulator transformer being coupled to a junction of said output switching means and said second diode, current beginning to flow in said first winding of said regulator transformer after said output switching means becomes conductive.

9. A circuit according to claim 7 or 8 wherein said second winding of said flyback transformer is coupled to said first winding of said regulator transformer and wherein the voltage developed across said second winding of said flyback transformer when said output switching means becomes conductive is reflected through said regulator transformer to turn off said second switching means.

10. A circuit according to claim 8 wherein said control means turns on said second switching means at a controlled instant within the interval inclusive of the retrace interval and the first part of the trace interval until the turn-on instant of said output switching means.

* * * * *